G. Erkson,

Flower Stand.

No. 113,035. Patented Mar. 28, 1871.

Witnesses:
E. Wolff.
Wm. H. E. Smith.

Inventor:
G. Erkson,
per Attorneys.

UNITED STATES PATENT OFFICE.

GARRETT ERKSON, OF BROOKLYN, NEW YORK.

Letters Patent No. 113,035, dated March 28, 1871.

IMPROVEMENT IN FLOWER-STANDS.

The Schedule referred to in these Letters Patent and making part of the same.

*To all whom it may concern:*

Be it known that I, GARRETT ERKSON, of Brooklyn, in the county of Kings and State of New York, have invented a new and useful Improvement in Flower-Stands; and I do hereby declare that the following is a full, clear, and exact description thereof, which will enable others skilled in the art to make and use the same, reference being had to the accompanying drawing forming part of this specification.

This invention relates to a new and useful improvement in stands for supporting flower-pots, whereby the stand is made both convenient and ornamental; and It consists in making each of the parts removable from the base, and to revolve thereon, and on parts supported thereby, and in the construction and arrangement of parts, as will be hereinafter more fully described and specified.

In the accompanying drawing—

Similar letters of reference indicate corresponding parts.

A is the stand or base, supported on legs B, with more or less holes, C, through it or in it, as represented.

This stand or base is made of cast-iron, and of any desired size.

D is the central post or pillar, connected with the stand so as to freely revolve thereon. This pillar diminishes in diameter from the base upward, and has shoulders for supporting the loose disks E, one or more in number.

These disks freely revolve on the pillar, and have the hole F through them or in them, as represented.

Figure 1:
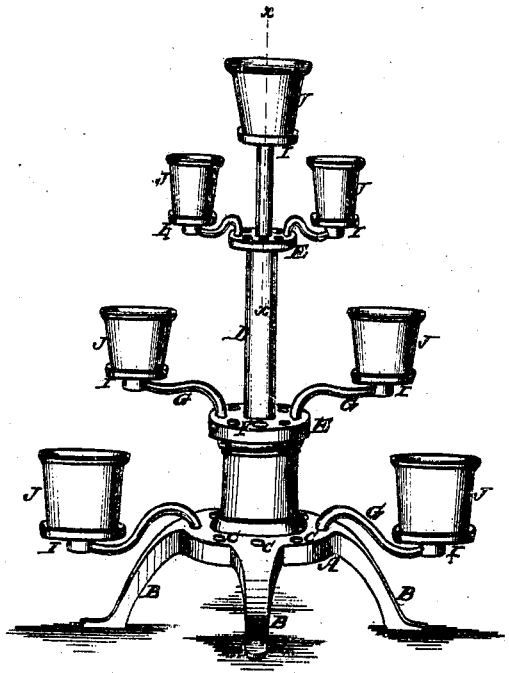
Figure 1 represents a perspective view of my improved flower-stand, showing a portion of the arms and pots in place, and the general construction and arrangement of the whole.
Figure 2:
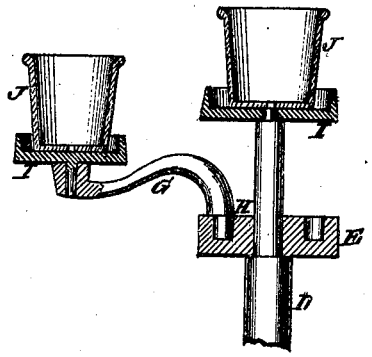
Figure 2 represents a vertical section on the line $x$ $x$ of fig. 1.
Figure 3:
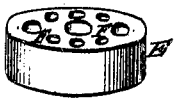
Figure 3 is a perspective view of one of the revolving disks, from which a portion of the arms is supported.

G represents arms, of any convenient form and length, with pivot ends, as seen at H, fig. 2, which allow them to turn or swing freely in the disks E.

In the other end of each of the arms there is a hole or socket, as seen in the same figure.

I represents cup-plates, which have pivots in the center of their bottoms, which pivots enter the holes or sockets in the arms G, as is also seen in the section, fig. 2.

J represents the flower-pots, which are placed in the cup-plates I.

By means of the pivots in the bottom of the cup-plates, the flower-pots may be revolved on the arms.

It will thus be seen that the pillar, the disks, the arms, and the pots are made to revolve, so that the position of all or any one of the pots may be changed at pleasure, thus rendering it extremely convenient for watering, arranging, and attending to the plants.

There may be casters under the legs, so that the flower-stand may be conveniently moved from place to place, as, for instance, toward or from a window, &c.

The central pillar of this stand may be made of wood or any other suitable material.

I do not confine myself to any particular materials, size, or proportions.

Having thus described my invention,

I claim as new and desire to secure by Letters Patent—

The base or stand A, pillar D, disks E, arms G, and cup-plates I, constructed and arranged substantially as and for the purposes herein shown and described.

GARRETT ERKSON.

Witnesses:
 GEO. W. MABEE,
 ALEX. F. ROBERTS.